(12) United States Patent
Iijima

(10) Patent No.: US 12,194,618 B2
(45) Date of Patent: Jan. 14, 2025

(54) HAND DEVICE AND WORKPIECE HANDLING SYSTEM

(71) Applicant: FANUC CORPORATION, Yamanashi (JP)

(72) Inventor: Hiroshi Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 17/784,279

(22) PCT Filed: Feb. 10, 2021

(86) PCT No.: PCT/JP2021/004926
§ 371 (c)(1),
(2) Date: Jun. 10, 2022

(87) PCT Pub. No.: WO2021/166756
PCT Pub. Date: Aug. 26, 2021

(65) Prior Publication Data
US 2023/0028764 A1    Jan. 26, 2023

(30) Foreign Application Priority Data
Feb. 17, 2020   (JP) ................................. 2020-024117

(51) Int. Cl.
*B25J 15/08* (2006.01)
*B25J 9/16* (2006.01)

(52) U.S. Cl.
CPC ............. *B25J 15/08* (2013.01); *B25J 9/1697* (2013.01)

(58) Field of Classification Search
CPC .... B25J 15/0057; B25J 15/0253; B25J 15/08; B25J 17/0233; B25J 19/023; B25J 9/1682;
(Continued)

(56) References Cited

U.S. PATENT DOCUMENTS

| 2015/0100147 A1* | 4/2015 | Izumi ..................... B25J 9/1682 700/250 |
| 2019/0270207 A1 | 9/2019 | Motowaki |

(Continued)

FOREIGN PATENT DOCUMENTS

| JP | S60-25670 A | 2/1985 |
| JP | 2777466 B2 | 7/1998 |

(Continued)

OTHER PUBLICATIONS

Translation of JP 2011083837 A (Year: 2012).*
(Continued)

*Primary Examiner* — Adam R Mott
*Assistant Examiner* — James Miller Watts, III
(74) *Attorney, Agent, or Firm* — Maier & Maier, PLLC

(57) ABSTRACT

A hand device is attached to a robot arm, grips a workpiece extending helically around a helical axis, and includes a base attached to the robot arm and a gripping part that is supported by the base in a rotatable manner around a predetermined rotation axis and that grips the workpiece. The gripping part grips the workpiece on the predetermined rotation axis such that the helical axis of the workpiece substantially extends along the predetermined rotation axis, and rotates in a helical direction of the workpiece in accordance with an external force acting on the workpiece in a tangential direction around the predetermined rotation axis.

7 Claims, 13 Drawing Sheets

(58) Field of Classification Search
CPC .......... B25J 9/16; B25J 9/1697; B25J 9/0009; G05B 2219/39109; G05B 2219/39129
See application file for complete search history.

(56) References Cited

U.S. PATENT DOCUMENTS

2021/0307592 A1* 10/2021 Takahashi .......... A61B 1/00121
2022/0009092 A1*  1/2022 Watanabe .............. G06V 20/10

FOREIGN PATENT DOCUMENTS

| JP | 2002-144186 A |   | 5/2002 |
|----|---------------|---|--------|
| JP | 2011083837 A  | * | 4/2011 |
| JP | 2012081564 A  | * | 4/2012 |
| JP | 2015077649 A  | * | 4/2015 |
| JP | 2019-150915 A |   | 9/2019 |

OTHER PUBLICATIONS

Translation of JP 2012081564 A (Year: 2011).*
Translation of JP 2015077649 A (Year: 2015).*
International Search Report mailed Apr. 20, 2021, in corresponding to International Application No. PCT/JP2021/004926; 6 pages (with English Translation).

* cited by examiner

HAND DEVICE AND WORKPIECE HANDLING SYSTEM

TECHNICAL FIELD

The present invention relates to hand devices and workpiece handling systems.

BACKGROUND

In the related art, a known robot hand includes a first hand section and a second hand section that are connected to each other by an elastic member and that are movable relative to each other in accordance with elastic deformation of the elastic member (for example, see Japanese Unexamined Patent Application, Publication No. 2019-150915.

SUMMARY

An aspect of the present disclosure provides a hand device that is attached to a robot arm and that grips a workpiece extending helically around a helical axis. The hand device includes a base attached to the robot arm and a gripping part that is supported by the base in a rotatable manner around a predetermined rotation axis and that grips the workpiece. The gripping part grips the workpiece on the predetermined rotation axis such that the helical axis substantially extends along the predetermined rotation axis, and rotates in a helical direction of the workpiece in accordance with an external force acting on the workpiece in a tangential direction around the predetermined rotation axis.

DETAILED DESCRIPTION OF THE EMBODIMENTS

A hand device and a workpiece handling system according to an embodiment will be described below with reference to the drawings.

Figure 1:
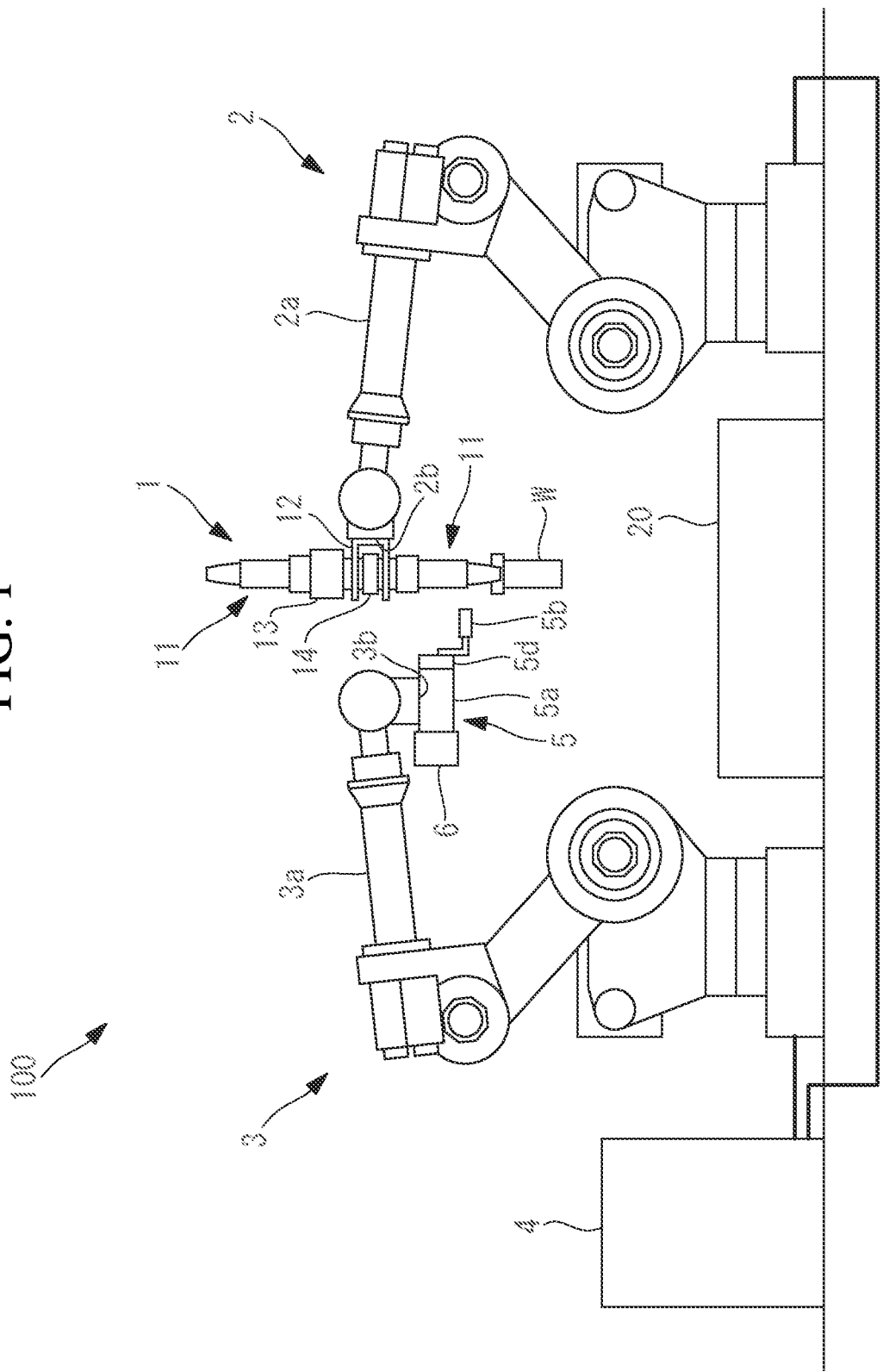
FIG. 1 illustrates the overall configuration of a workpiece handling system according to an embodiment.

As shown in FIG. 1, a workpiece handling system 100 is a robot system including two industrial robots 2 and 3 and a control device 4 that controls the robots 2 and 3. A container 20 for accommodating multiple workpieces W therein is disposed in the vicinity of the robots 2 and 3. The first robot 2 retrieves and inserts the multiple workpieces W one by one from and into the container 20, and the second robot 3 guides the workpieces W to be retrieved from and inserted into the container 20.

The robots 2 and 3 are, for example, six-axis vertical articulated robots and respectively have robot arms 2a and 3a and attachment surfaces 2b and 3b provided at the distal ends of the robot arms 2a and 3a. Each of the robots 2 and 3 may be a vertical articulated robot of a type other than a six-axis type, or may be another type of robot.

Figure 2:
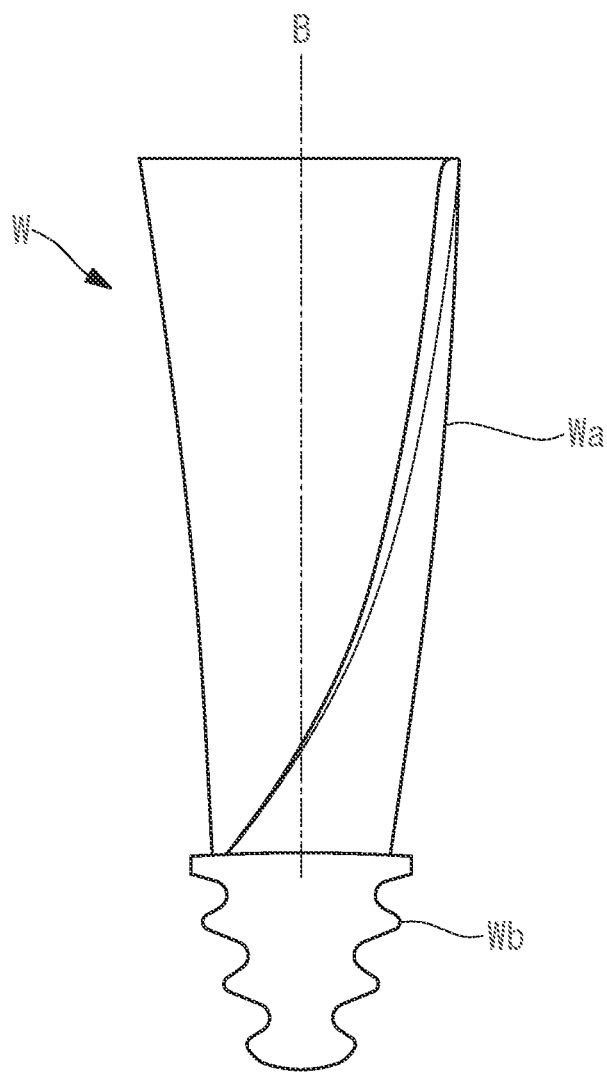
FIG. 2 illustrates a blade serving as an example of a workpiece.

As shown in FIG. 2, each workpiece W has a helical section Wa having a helically curved shape. The workpiece W shown in FIG. 2 is an example of a blade of an aircraft engine and has a vane Wa at the distal end and a base Wb at the base end. The vane Wa is a helical section extending helically around a helical axis B from the base end toward the distal end of the blade W. The base Wb is a part to be coupled to a disk of an engine and is to be fitted into a recess provided in an outer peripheral section of the disk. Multiple types of blades W with different sizes and different helical shapes are used in a single engine.

Figure 3:
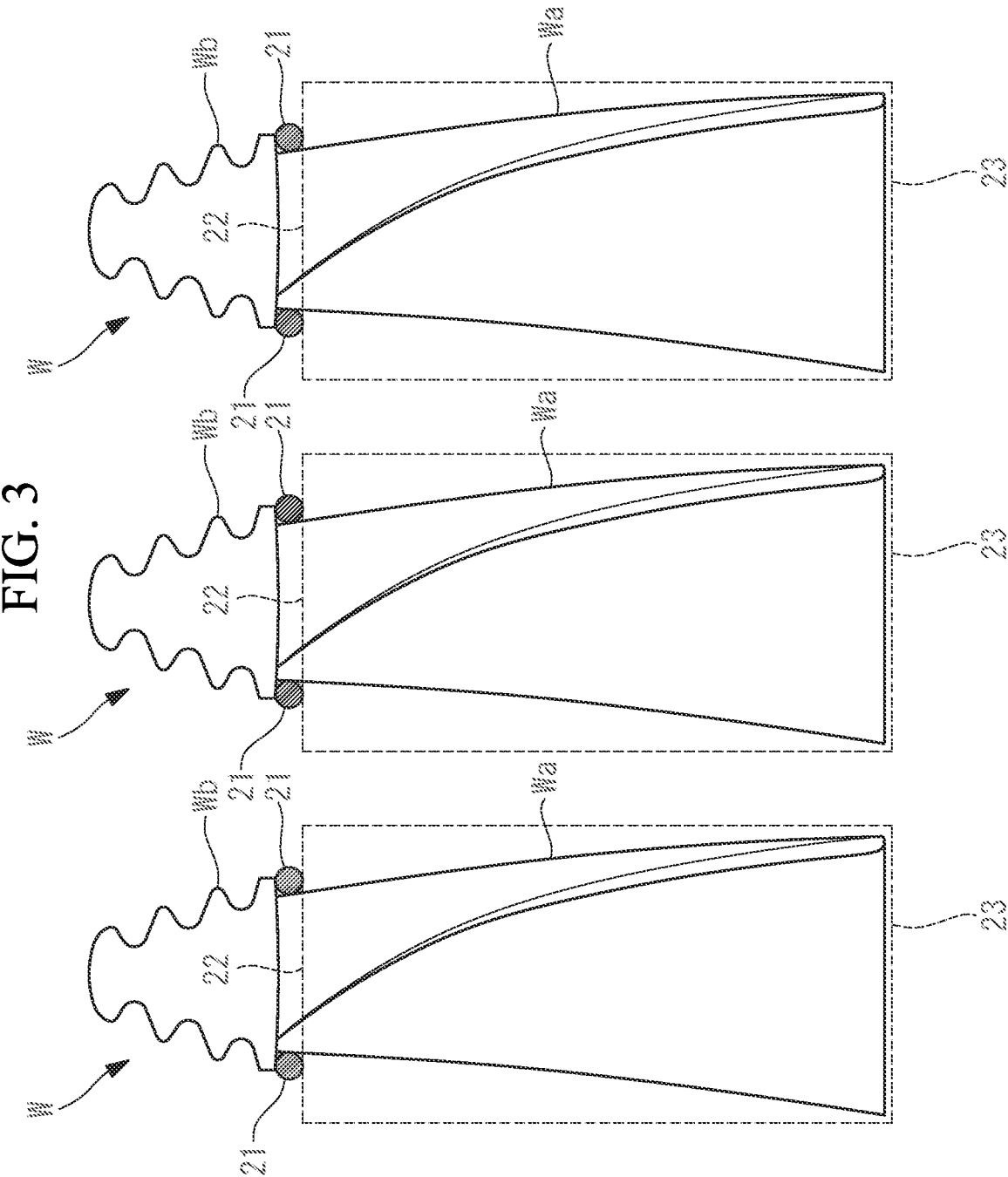
FIG. 3 illustrates workpieces contained in a container.

For example, when the engine is to be overhauled, the multiple disassembled blades W are accommodated in the container 20. A plurality of wires 21 are extended parallel to each other across an upper opening of the container 20, and the opening of the container 20 is segmented into a plurality of access ports 22 by the plurality of wires 21. As shown in FIG. 3, each blade W is accommodated in a workpiece accommodation section 23 below the corresponding access port 22, and the base Wb is hooked between a pair of wires 21, so that the blade W hangs down into the workpiece accommodation section 23. Because the blade W has a helical shape, the blade W interferes with the wires 21 when the blade W is translationally moved upward.

The workpiece handling system 100 includes a hand device 1 attached to the attachment surface 2b of the robot arm 2a, and also includes a guide device 5 and a vision sensor 6 that are attached to the attachment surface 3b of the robot arm 3a. The hand device 1, the guide device 5, and the vision sensor 6 are moved three-dimensionally in accordance with the operation of the robot arms 2a and 3a. The hand device 1, the guide device 5, and the vision sensor 6 are rotatable around an axis orthogonal to the attachment surfaces 2b and 3b in accordance with rotation of the attachment surfaces 2b and 3b. The hand device 1, the vision sensor 6, and the guide device 5 are controlled by the control device 4.

Figure 4:
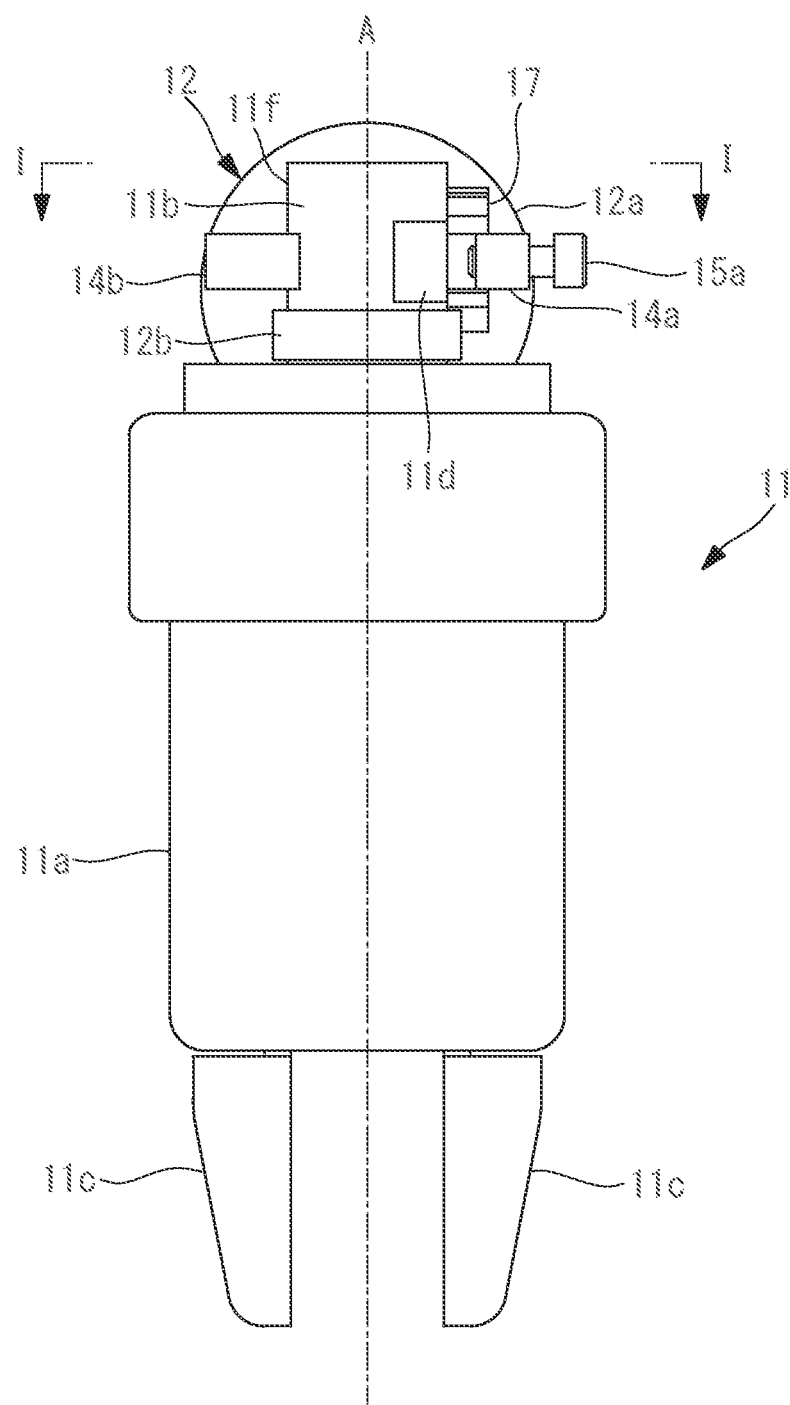
FIG. 4 is a partial side view of a hand device according to an embodiment.
Figure 5:
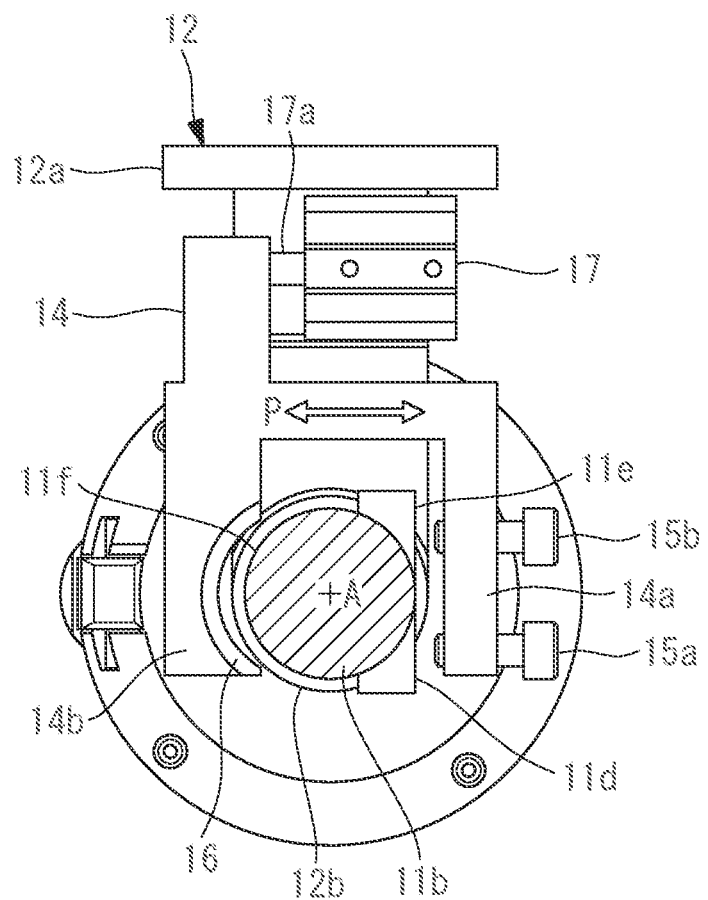
FIG. 5 is a cross-sectional view of the hand device in FIG. 4, taken along line I-I.

As shown in FIGS. 1, 4, and 5, the hand device 1 includes grippers (gripping parts) 11 each of which grips a workpiece W, a base 12 that is attached to the attachment surface 2b and that supports the grippers 11 rotatably around a predetermined rotation axis A, and a weight sensor 13 that measures the weight of the workpiece W gripped by each gripper 11.

Each gripper 11 has a gripper body 11a, a cylindrical shaft 11b that is fixed to the gripper body 11a and that protrudes from the base end surface of the gripper body 11a, and a plurality of fingers 11c that are disposed at the distal end of the gripper body 11a and that are openable and closable relative to each other. The central axis of the shaft 11b serves as the predetermined rotation axis A.

The hand device 1 is a double hand having two grippers 11 that share a single shaft 11b and that are oriented in opposite directions from each other. FIG. 4 illustrates only one of the two grippers 11. The hand device 1 may alternatively be a single hand having only one gripper 11.

The plurality of fingers 11c are arranged around the rotation axis A with a gap therebetween in the circumferential direction. Although each gripper 11 shown in the reference drawings has only two fingers 11c, each gripper 11 may have three or more fingers 11c. The plurality of fingers 11c close as a result of the plurality of fingers 11c moving toward the rotation axis A, whereas the plurality of fingers 11c open as a result of the plurality of fingers 11c moving away from the rotation axis A. A workpiece W is gripped on the rotation axis A by the plurality of closed fingers 11c, and rotates around the rotation axis A and on the rotation axis A in accordance with rotation of the gripper 11.

The base 12 has a fixed section 12a fixed to the attachment surface 2b of the robot arm 2a, and also has at least one support section 12b that supports the shaft 11b. The support section 12b has a hole through which the shaft 11b extends, and supports the gripper 11 rotatably around the rotation axis A by using a bearing (not shown) disposed between an outer peripheral surface 11f of the shaft 11b and the inner peripheral surface of the hole. Therefore, the plurality of fingers 11c and the workpiece W gripped by the plurality of fingers 11c are capable of rotating freely around the rotation axis A relative to the base 12, but are not capable of moving in a direction along the rotation axis A and in a direction orthogonal to the rotation axis A relative to the base 12.

In one example, the base 12 is a U-shaped bracket having two tabular support sections 12b that are parallel to each other and a tabular fixed section 12a that connects ends of the two support sections 12b to each other, and supports the two grippers 11 such that the rotation axis A is parallel to the attachment surface 2b.

Furthermore, the hand device 1 includes a movable member 14 disposed at the radially outer side of the shaft 11b, a pair of stoppers (return-to-origin mechanism, rotation restricting mechanism) 15a and 15b and a brake unit (rotation locking mechanism) 16 that are provided at the movable member 14, and an air cylinder (driver) 17 that moves the movable member 14 in a predetermined movement direction P orthogonal to the rotation axis A relative to the grippers 11 and the base 12. In the reference drawings, the movement direction P is parallel to the attachment surface 2b of the robot arm 2a.

As shown in FIG. 5, the movable member 14 has a first section 14a and a second section 14b that face each other in the movement direction P with the shaft 11b interposed therebetween. The first section 14a is provided with the pair of stoppers 15a and 15b, and the second section 14b is provided with the brake unit 16. The distance between the first section 14a and the second section 14b is larger than the diameter of the shaft 11b, so that the movable member 14 can be disposed in a state where the pair of stoppers 15a and 15b and the brake unit 16 are both positioned away from the shaft 11b.

The pair of stoppers 15a and 15b are arranged around the rotation axis A with a gap therebetween in the circumferential direction, and protrude in the movement direction P from the inner side surface of the first section 14a toward the shaft 11b. As will be described later, depending on the position of the movable member 14, the pair of stoppers 15a and 15b alternately function as a rotation restricting mechanism that restricts the rotation of each gripper 11 within a predetermined angular range and a return-to-origin mechanism that causes the rotational position of each gripper 11 around the rotation axis A to return to a predetermined origin position.

The outer peripheral surface 11f of the shaft 11b is provided with a pair of protrusions 11d and 11e that function as the return-to-origin mechanism and the rotation restricting mechanism together with the pair of stoppers 15a and 15b. The pair of protrusions 11d and 11e are provided at the same side relative to the rotation axis A, and protrude away from each other from the outer peripheral surface 11f in a tangential direction of a circle extending around the rotation axis A. As shown in FIG. 5, the shaft 11b is disposed in an orientation where the pair of protrusions 11d and 11e are disposed at the first section 14a side, and the pair of protrusions 11d and 11e respectively face the pair of stoppers 15a and 15b in the movement direction P. The distal ends of the pair of protrusions 11d and 11e are disposed outward in the circumferential direction relative to the distal ends of the pair of stoppers 15a and 15b.

The stoppers 15a and 15b may be positionally adjustable in the movement direction P relative to the movable member 14. For example, the pair of stoppers 15a and 15b may be a pair of screws inserted toward the shaft 11b in the movement direction P into a pair of screw holes provided in the first section 14a. The distal-end positions of the screws 15a and 15b can be finely adjusted in the movement direction P by rotating the screws 15a and 15b.

The brake unit 16 is provided at the inner side surface of the second section 14b and faces the outer peripheral surface 11f of the shaft 11b in the movement direction P. The brake unit 16 is movable between a lock position and an unlock position by moving the movable member 14. At the lock position, the brake unit 16 is pressed against the outer peripheral surface 11f, so that the rotation of the grippers 11 relative the base 12 is locked by the friction between the brake unit 16 and the outer peripheral surface 11f. At the unlock position, the brake unit 16 is positioned away from the outer peripheral surface 11f, thereby unlocking the rotation of the grippers 11.

In order to increase the contact area between the brake unit 16 and the outer peripheral surface 11f to increase the frictional force, the brake unit 16 may have a recessed surface that has a shape complementary to the outer peripheral surface 11f, which is cylindrical, and that comes into close contact with the outer peripheral surface 11f. Alternatively, in order to increase the frictional force, the brake unit 16 may have a high-friction member in an area that comes into contact with the outer peripheral surface 11f.

The air cylinder 17 has a piston rod 17a that extends and retracts in the movement direction P, and is capable of positioning the piston rod 17a at a retracted end, an extended end, and an intermediate position between the retracted end and the extended end. The movable member 14 is fixed to the distal end of the piston rod 17a. As shown in FIG. 6, FIGS. 7A to 7C, and FIGS. 8A to 8C, the air cylinder 17 moves the movable member 14 in the movement direction P among a return-to-origin position, a free rotational position, and a lock position by extending and retracting the piston rod 17*a*, thereby switching among three states shown in FIG. 6, FIGS. 7A to 7C, and FIGS. 8A to 8C.

Figure 6:
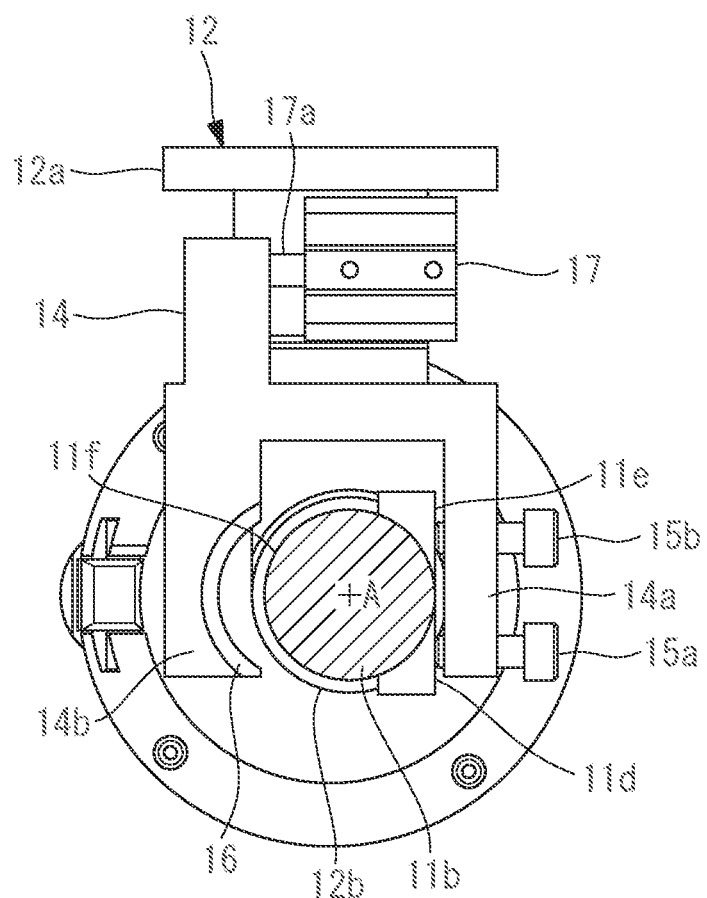
FIG. 6 is a diagram for explaining the operation of the hand device and illustrates a return-to-origin state where a gripper is positioned at an origin position by a return-to-origin mechanism.

FIG. 6 illustrates a return-to-origin state where the piston rod 17*a* is disposed at the extended end and the movable member 14 is disposed at the return-to-origin position. In the return-to-origin state, the brake unit 16 is disposed at the unlock position, and the pair of stoppers 15*a* and 15*b* function as the return-to-origin mechanism. Specifically, the distal ends of the pair of stoppers 15*a* and 15*b* simultaneously come into contact with the pair of protrusions 11*d* and 11*e*, so that the rotational position of each gripper 11 around the rotation axis A is set at the predetermined origin position. In the example in FIG. 6, the predetermined origin position is where the tangential direction in which the pair of protrusions 11*d* and 11*e* protrude is parallel to a line that connects the distal ends of the pair of stoppers 15*a* and 15*b*. If the pair of stoppers 15*a* and 15*b* are screws, the predetermined origin position can be changed by positionally adjusting the distal ends of the screws in the movement direction P.

Figure 7A:
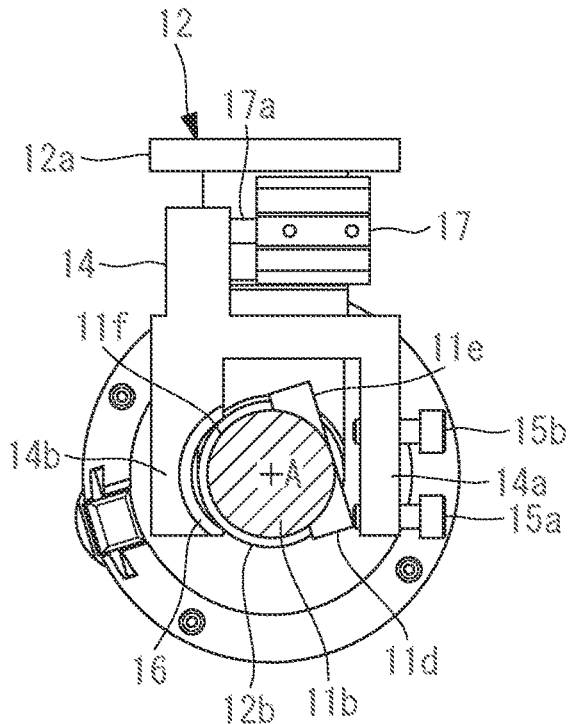
FIG. 7A is a diagram for explaining the operation of the hand device and illustrates an example of a free rotational state where the gripper is rotatable within a predetermined angular range restricted by a rotation restricting mechanism.
Figure 7B:
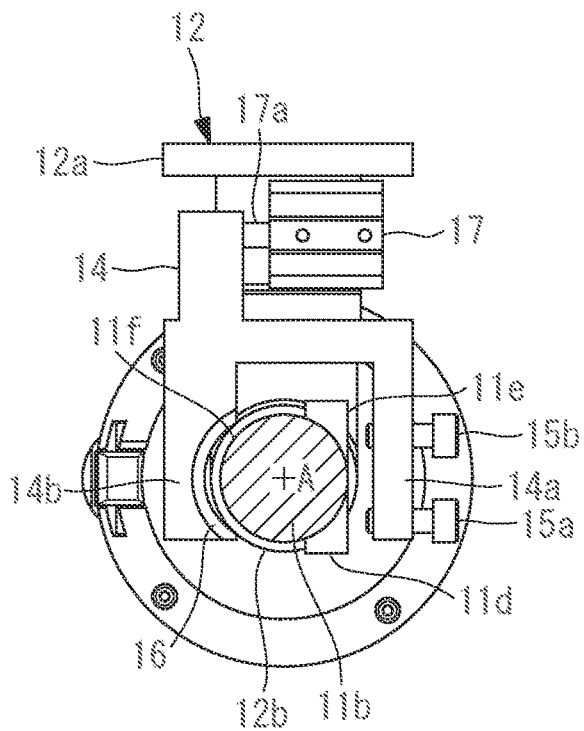
FIG. 7B illustrates another example of the free rotational state.
Figure 7C:
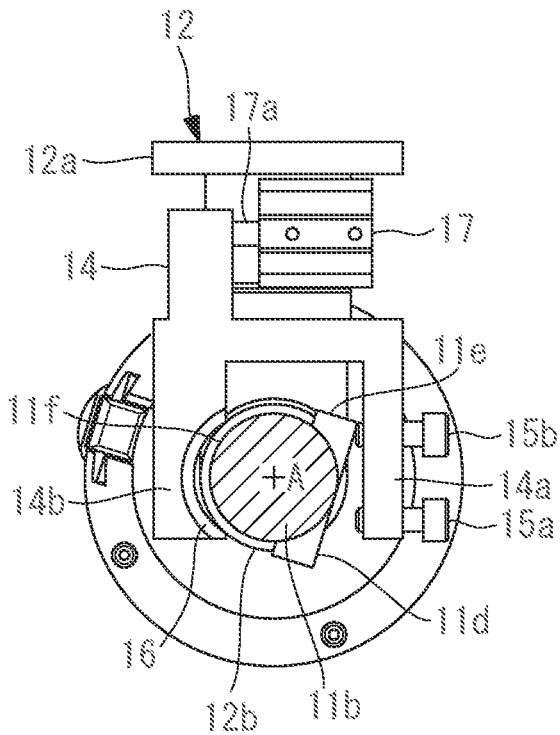
FIG. 7C illustrates another example of the free rotational state.

FIGS. 7A to 7C illustrate a free rotational state where the piston rod 17*a* is disposed at the intermediate position and the movable member 14 is disposed at the free rotational position between the return-to-origin position and the lock position. In the free rotational state, the brake unit 16 is disposed at the unlock position, and the pair of stoppers 15*a* and 15*b* function as the rotation restricting mechanism. Specifically, the distal ends of the pair of stoppers 15*a* and 15*b* are disposed at positions located away from the pair of protrusions 11*d* and 11*e* at the origin position in the movement direction P, and each gripper 11 is rotatable between a rotational position where one protrusion 11*d* abuts on one stopper 15*a* in the circumferential direction and a rotational position where the other protrusion 11*e* abuts on the other stopper 15*b*. If the pair of stoppers 15*a* and 15*b* are screws, the predetermined angular range can be changed by positionally adjusting the distal ends of the screws in the movement direction P.

Figure 8A:
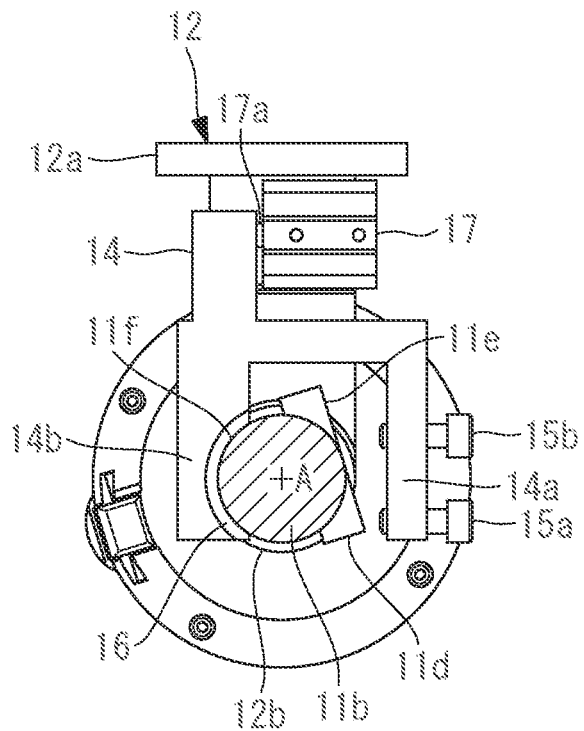
FIG. 8A is a diagram for explaining the operation of the hand device and illustrates an example of a rotation-locked state where the rotation of the gripper is locked by a rotation locking mechanism.
Figure 8B:
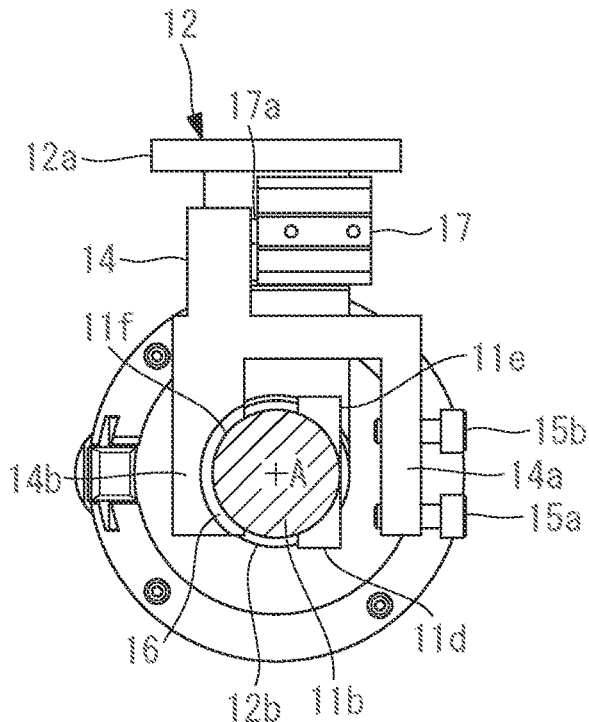
FIG. 8B illustrates another example of the rotation-locked state.
Figure 8C:
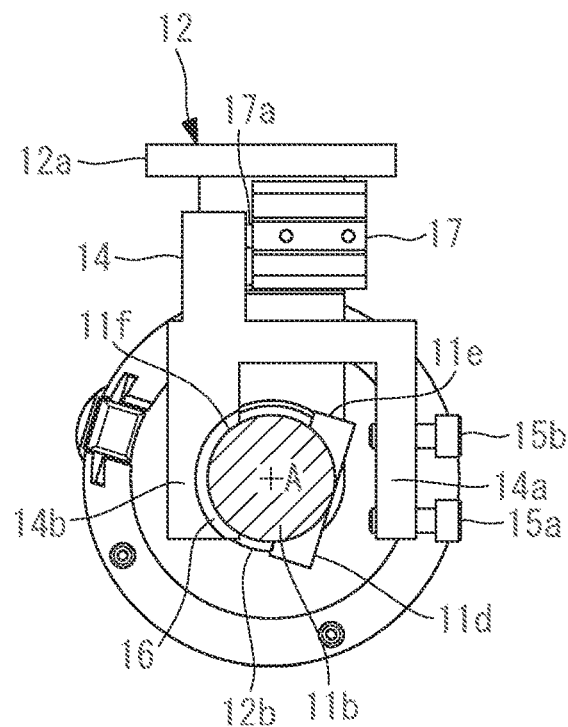
FIG. 8C illustrates another example of the rotation-locked state.

FIGS. 8A to 8C illustrate a rotation-locked state where the piston rod 17*a* is disposed at the retracted end and the movable member 14 is disposed at the lock position. In the rotation-locked state, the brake unit 16 is disposed at a rotation-locking position, so that the rotation of each gripper 11 around the rotation axis A is locked. As shown in FIGS. 8A to 8C, the brake unit 16 is in close contact with the outer peripheral surface 11*f* in one circumferential area of the outer peripheral surface 11*f*, so that the rotation of each gripper 11 disposed at any rotational position within the predetermined angular range can be locked.

As shown in FIG. 1, the guide device 5 includes a base 5*a* fixed to the attachment surface 3*b* of the robot arm 3*a*, a pair of guide members 5*b* and 5*c* supported by the base 5*a*, and a driver 5*d* that relatively moves the pair of guide members 5*b* and 5*c*.

The pair of guide members 5*b* and 5*c* are cylindrical members that are parallel to each other. The pair of guide members 5*b* and 5*c* are disposed parallel to the longitudinal direction of each access port 22 at the opposite sides of the access port 22, and guide each workpiece W to retrieve and insert the workpiece W from and into the workpiece accommodation section 23 while rotating the workpiece W in the helical direction thereof (see FIGS. 9 to 12). Specifically, when the helical section Wa of the workpiece W comes into contact with the guide member 5*b* or 5*c* while ascending or descending along the rotation axis A, an external force acting in the tangential direction around the rotation axis A is applied from the guide member 5*b* or 5*c* to the workpiece W and the corresponding gripper 11, whereby the gripper 11 rotates in the helical direction of the workpiece W in accordance with the external force.

The guide members 5*b* and 5*c* may have cylindrical rollers that rotate around the longitudinal axes of the guide members 5*b* and 5*c* so that the workpiece W ascends and descends smoothly while remaining in contact with the guide members 5*b* and 5*c*. Alternatively, in order to reduce the friction between the workpiece W and the guide members 5*b* and 5*c*, the outer peripheral surfaces of the guide members 5*b* and 5*c* may be composed of a low-friction material, such as polytetrafluoroethylene.

The driver 5*d* is, for example, an electric actuator connected to the pair of guide members 5*b* and 5*c*. The driver 5*d* moves the pair of guide members 5*b* and 5*c* toward and away from each other to adjust the gap between the pair of guide members 5*b* and 5*c*.

The vision sensor 6 is, for example, a two-dimensional camera. The vision sensor 6 acquires an image of each workpiece W in the container 20 and transmits the image to the control device 4.

The control device 4 is connected to the two robots 2 and 3, the hand device 1, the guide device 5, the vision sensor 6, and the weight sensor 13. The control device 4 controls the robots 2 and 3, the hand device 1, and the guide device 5 based on the image acquired by the vision sensor 6, and causes the robots 2 and 3, the hand device 1, and the guide device 5 to execute a retrieving operation involving retrieving each workpiece W from the container 20 and an inserting operation involving inserting each workpiece W into the container 20. For example, the control device 4 includes a processor and a storage unit that stores an operation program. The processor executes processing in accordance with the operation program, so that the retrieving operation and the inserting operation of each workpiece W are implemented.

Next, the operation of the workpiece handling system 100 will be described.

FIGS. 9 to 12 illustrate a weight measuring process performed one by one on the multiple workpieces W contained in the container 20. In FIGS. 9 to 12, the wires 21 and the access ports 22 are not shown.

Figure 9:
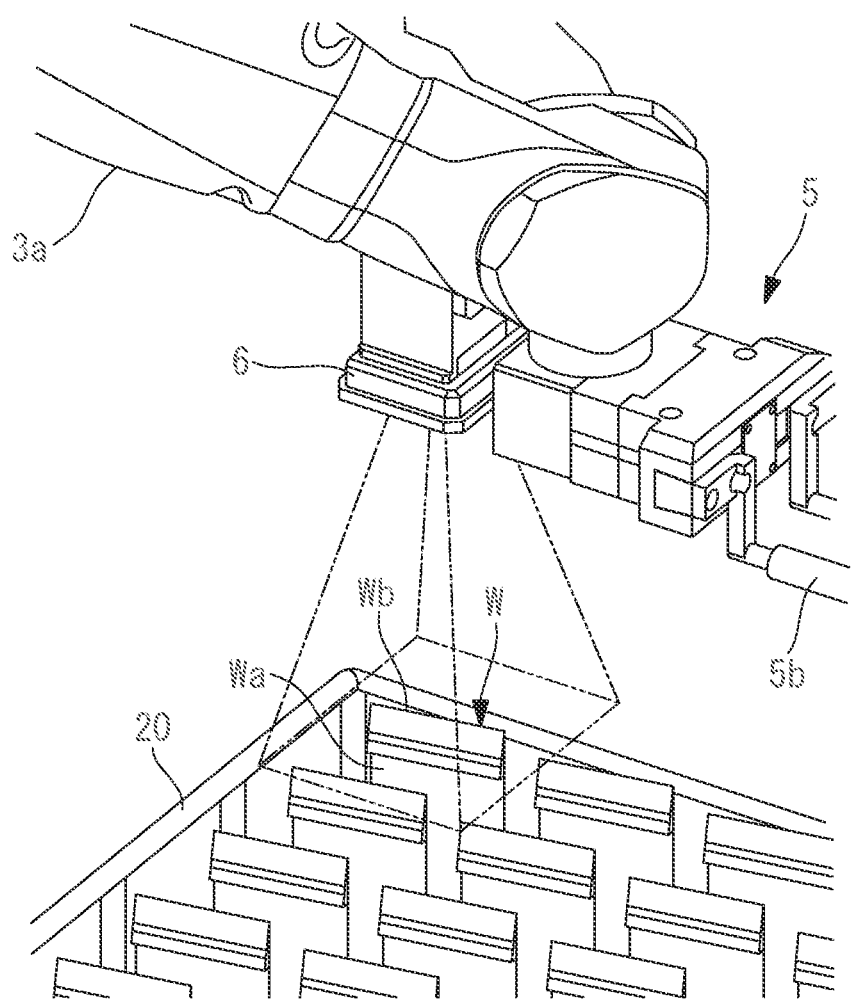
FIG. 9 is a diagram for explaining how each workpiece is handled by the workpiece handling system.

First, as shown in FIG. 9, the control device 4 operates the robot arm 3*a* to move the vision sensor 6 to a position where the visual field of the vision sensor 6 covers one of the access ports 22. Then, the control device 4 causes the vision sensor 6 to acquire an image. The acquired image includes the bottom surface of the base Wb of the corresponding workpiece W.

Subsequently, the control device 4 detects whether or not there is a workpiece W and the position of the workpiece W based on the image. For example, the control device 4 detects the workpiece W by recognizing the bottom surface of the base Wb within the image. Then, the control device 4 recognizes four side surfaces adjacent to the bottom surface of the base Wb within the image, calculates a center line between one pair of side surfaces facing each other and a center line between the other pair of side surfaces facing each other, and detects the center position of the bottom surface serving as an intersection point of the two center lines as the position of the workpiece W.

Figure 10:
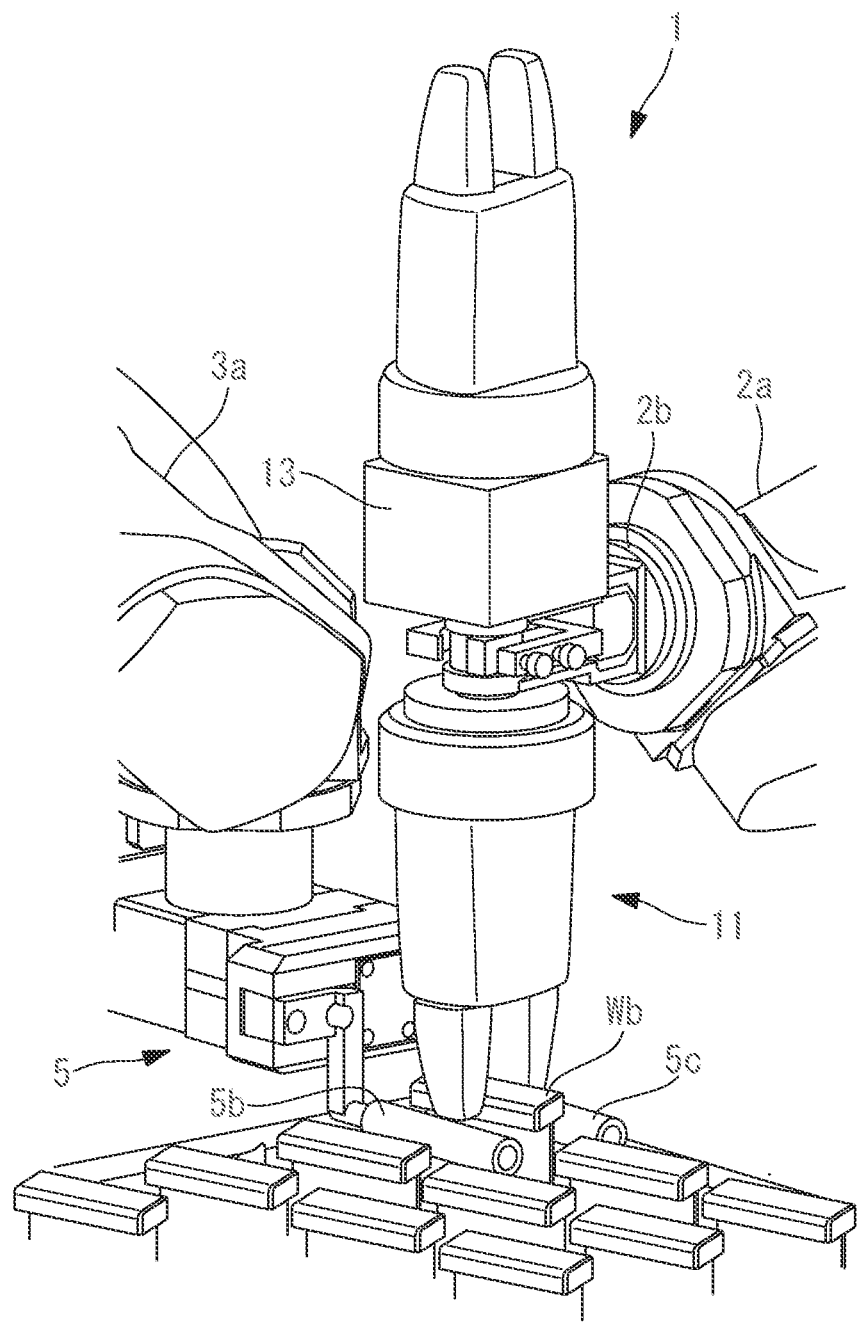
FIG. 10 is a diagram for explaining how each workpiece is handled by the workpiece handling system.

Subsequently, as shown in FIG. 10, the control device 4 operates the robot arms 2*a* and 3*a* based on the detected position of the workpiece W, so as to move the hand device 1 and the guide device 5 closer toward the workpiece W. In this case, the control device 4 actuates the air cylinder 17 to move the movable member 14 to the return-to-origin position, thereby returning the gripper 11 to the origin position. Then, the control device 4 sets the hand device 1 such that the center position of the bottom surface serving as the detected position of the workpiece W is aligned with the rotation axis A and that the plurality of fingers 11c are disposed at opposite sides of the workpiece W in the width direction thereof.

Subsequently, the control device 4 controls the hand device 1 to cause the gripper 11 to grip the base Wb of the workpiece W. The workpiece W is gripped by the gripper 11 such that the helical axis B of the helical section Wa extends along the rotation axis A. Moreover, the control device 4 sets the pair of guide members 5b and 5c at opposite sides of the access port 22 to sandwich the base end of the helical section Wa between the pair of guide members 5b and 5c, thereby adjusting the gap between the pair of guide members 5b and 5c to a gap equivalent to the width of the access port 22. In this case, the hand device 1 may be caused to ascend slightly to lift the base end of the helical section Wa above the wires 21.

Figure 11:
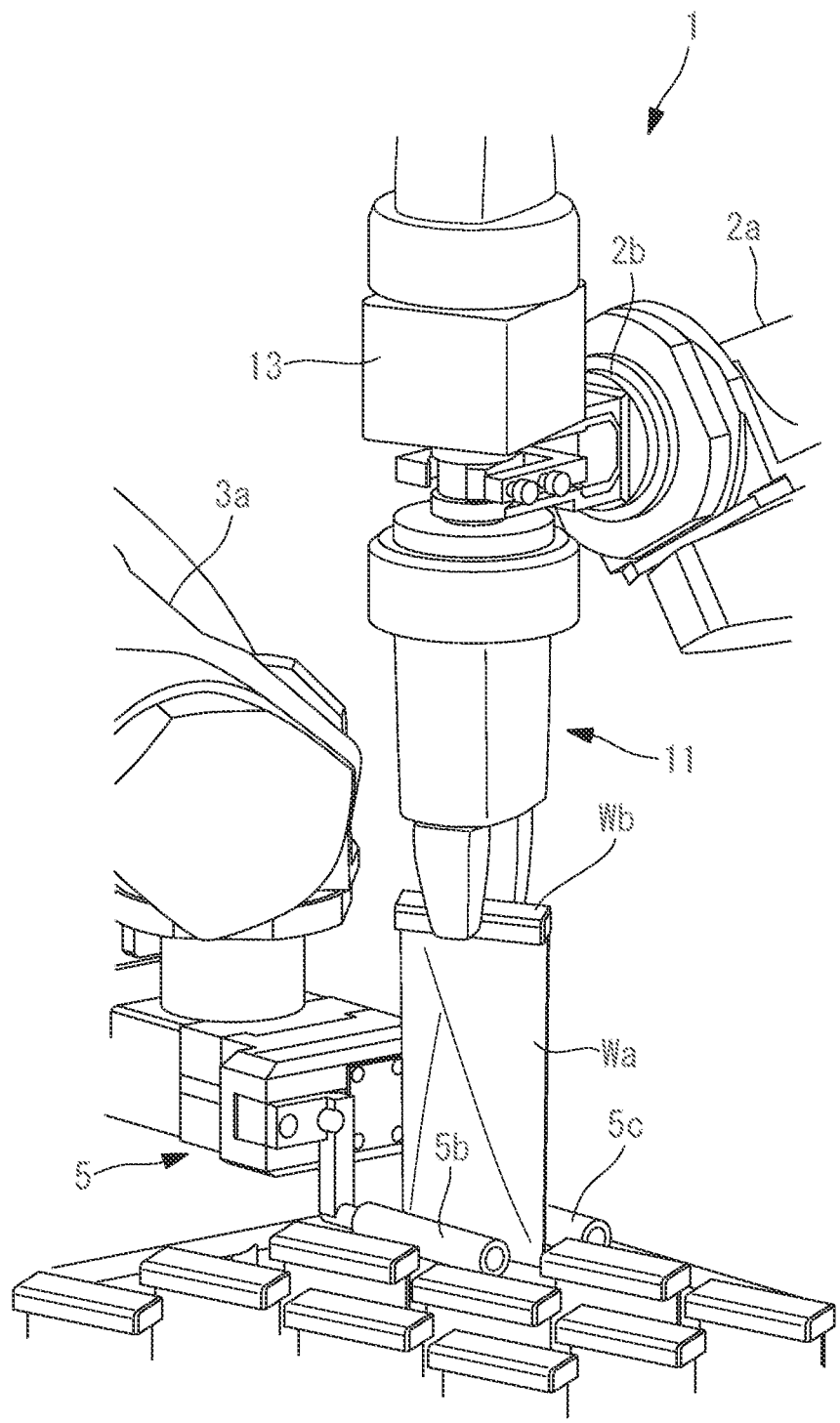
FIG. 11 is a diagram for explaining how each workpiece is handled by the workpiece handling system.
Figure 12:
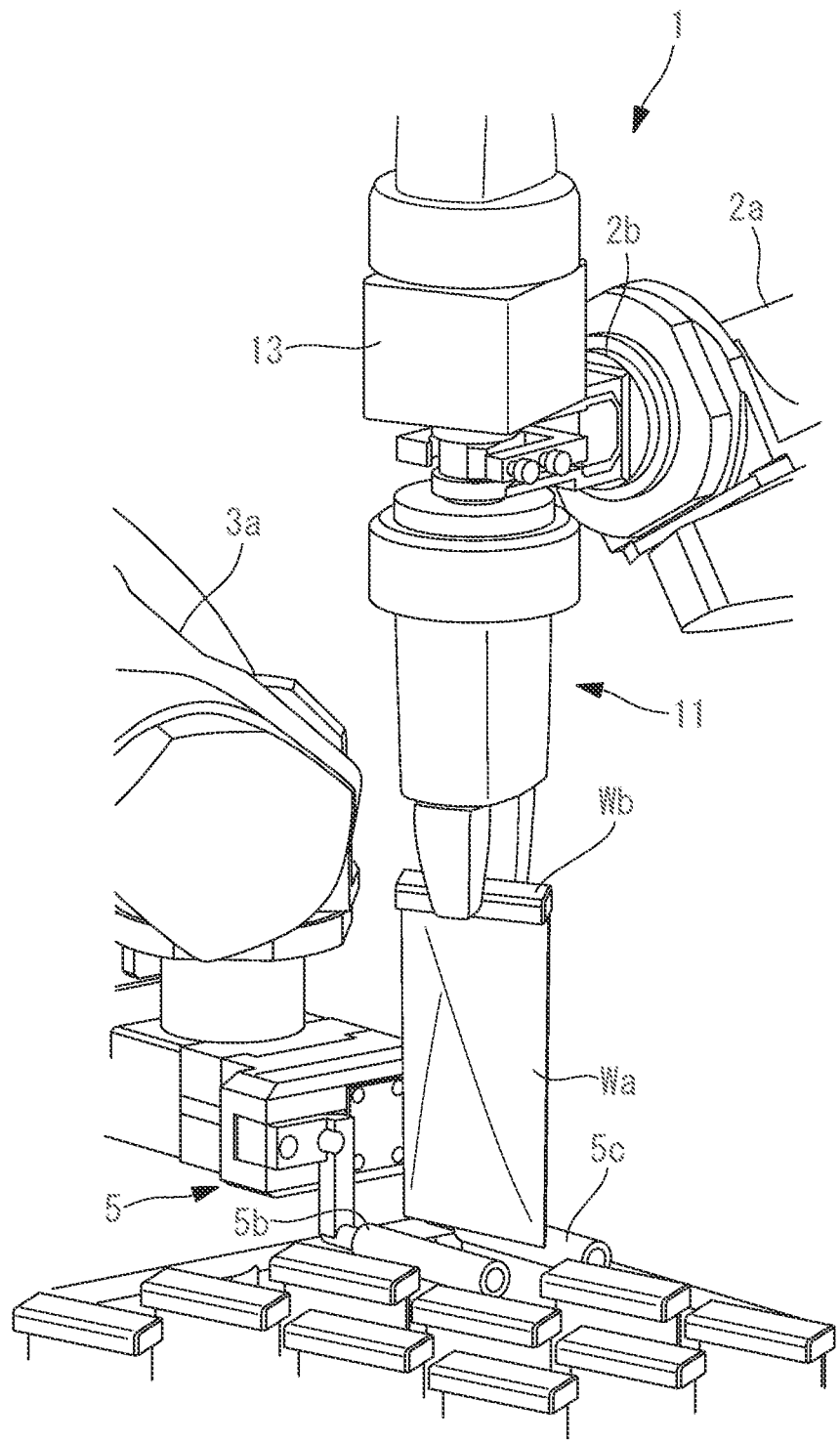
FIG. 12 is a diagram for explaining how each workpiece is handled by the workpiece handling system.

Subsequently, the control device 4 actuates the air cylinder 17 to move the movable member 14 to the free rotational position, thereby setting the gripper 11 in a rotatable state. Then, as shown in FIG. 11, the control device 4 operates the robot arm 2a to translationally move the attachment surface 2b upward in the vertical direction, thereby causing the hand device 1 gripping the workpiece W to ascend in the vertical direction. In the ascending process of the workpiece W, the helical section Wa comes into contact with the guide member 5b or 5c so that the gripper 11 and the workpiece W rotate together smoothly. Thus, the workpiece W is retrieved from the workpiece accommodation section 23 while rotating in the helical direction.

Subsequently, the control device 4 actuates the air cylinder 17 to move the movable member 14 to the lock position, thereby locking the rotation of the gripper 11 gripping the workpiece W. Then, the control device 4 causes the weight sensor 13 to measure the weight of the workpiece W, and stores the measured weight value.

Then, the control device 4 actuates the air cylinder 17 to move the movable member 14 to the free rotational position, thereby setting the gripper 11 in a rotatable state. Then, the control device 4 actuates the robot arm 2a to translationally move the attachment surface 2b downward in the vertical direction, thereby causing the hand device 1 gripping the workpiece W to descend in the vertical direction. In the descending process of the workpiece W, the helical section Wa comes into contact with the guide member 5b or 5c so that the gripper 11 and the workpiece W rotate together smoothly. Thus, the workpiece W is inserted into the workpiece accommodation section 23 via the access port 22 while rotating in the helical direction. The rotational direction of the workpiece W and the gripper 11 in this case is the opposite direction of the rotational direction of the workpiece W and the gripper 11 during the retrieving operation.

In the related art, in order to retrieve and insert helical workpieces W from and into small workpiece accommodation sections 23 while rotating the workpieces W, operation programs having multiple teaching positions according to helical shapes of workpieces W are used. If workpieces W to be handled are of a single type having the same helical shape, a single type of operation program is sufficient. If workpieces W to be handled are of multiple types having different helical shapes, it is necessary to create multiple types of operation programs having different teaching positions. In this case, the teaching process requires a large number of steps, and the management of the multiple types of programs is difficult.

According to this embodiment, the workpiece W gripped by the gripper 11 is rotatable together with the gripper 11 around the rotation axis A extending along the helical axis B, and comes into contact with the guide member 5b or 5c to ascend or descend while rotating in accordance with the helical shape. Thus, workpieces W having different helical shapes can be retrieved from and inserted into the workpiece accommodation sections 23 having a small width in accordance with a simple common operation involving translationally moving the attachment surface 2b at the distal end of the robot arm 2a in the vertical direction. Specifically, a common operation program can be used for retrieving and inserting various workpieces W from and into the workpiece accommodation sections 23, thereby reducing the number of steps involved in the teaching process and facilitating the management of the operation program.

Furthermore, the information about whether or not there is a workpiece W and about the position of the workpiece W is acquired by using the vision sensor 6. Thus, in a case where the plurality of access ports 22 are arranged at a predetermined pitch, one workpiece W having undergone the weight measuring process is returned to the corresponding workpiece accommodation section 23, the hand device 1 and the guide device 5 are then moved by the predetermined pitch, and the operation shown in FIGS. 9 to 12 is subsequently repeated, so that the weight measuring process can be performed on another workpiece W. Specifically, the plurality of workpieces W contained in the container 20 can be retrieved therefrom and inserted therein in accordance with a single basic operation pattern alone.

Furthermore, a support mechanism that rotatably supports each gripper 11 is realized by a simple mechanical configuration. Thus, appropriate rotation of each workpiece W in accordance with the helical shape thereof can be realized with high reliability and at low cost.

In the above embodiment, an access port 22 may further be detected by using the vision sensor 6.

For example, when a workpiece W is to be inserted into a vacant workpiece accommodation section 23, the control device 4 detects the position of the access port 22 of the vacant workpiece accommodation section 23 based on the image acquired by the vision sensor 6, and controls the robot arms 2a and 3a based on the detected position of the access port 22, thereby setting the hand device 1 and the guide device 5 close to the access port 22 of the vacant workpiece accommodation section 23. Accordingly, the workpiece W can be inserted automatically into the vacant workpiece accommodation section 23.

As an alternative to the above embodiment in which the air cylinder 17 is used as the driver for moving the movable member 14, another device that can positionally set the movable member 14 to three positions may be used. For example, the driver may be an electric cylinder.

In the above embodiment, the guide device 5 may further include a noncontact sensor that detects a workpiece W between the pair of guide members 5b and 5c in a noncontact fashion. For example, the noncontact sensor has a light source that is provided in one guide member 5b and that outputs a laser beam from the guide member 5b toward the other guide member 5c, and also has a photodetector that is provided in the other guide member 5c and that detects the laser beam.

In the retrieving operation of the workpiece W, the noncontact sensor detects the workpiece W while at least a portion of the workpiece W is contained in the workpiece accommodation section 23, and the noncontact sensor no longer detects the workpiece W when the workpiece W is completely retrieved from the workpiece accommodation section 23. Based on this change from the detected state to the non-detected state of the workpiece W, the control device 4 detects that the workpiece W has been completely retrieved from the workpiece accommodation section 23, and causes the hand device 1 to stop ascending.

For example, blades W of various lengths are used in aircraft engines. With the noncontact sensor provided, the hand device 1 can be stopped from ascending at an appropriate position for each workpiece W even when the workpieces W have different lengths.

As an alternative to the above embodiment in which the return-to-origin mechanism, the rotation restricting mechanism, and the rotation locking mechanism alternately execute their functions in accordance with the movement of the common movable member 14, the return-to-origin mechanism, the rotation restricting mechanism, and the rotation locking mechanism may operate independently of one another. In this case, the specific configurations of the return-to-origin mechanism, the rotation restricting mechanism, and the rotation locking mechanism are not limited to the configurations described above, and freely-chosen configurations may be employed.

For example, the pair of stoppers 15a and 15b and the brake unit 16 may be provided at separate movable members and may be moved by separate drivers.

Moreover, a stopper serving as the return-to-origin mechanism and a stopper serving as the rotation restricting mechanism may be provided separately from each other. In this case, the configurations of the stopper and the protrusion serving as the rotation restricting mechanism may be changed. For example, a single protrusion may be movable in the circumferential direction between a pair of stoppers, or a single stopper may be disposed between a pair of protrusions protruding radially outward from the outer peripheral surface 11f.

The workpiece handling system 100 in the above embodiment includes the two robots 2 and 3 and the guide device 5, but does not necessarily have to include the second robot 3 and the guide device 5.

For example, the vision sensor 6 may be attached to the distal end of the robot arm 2a of the first robot 2. In this case, the workpiece W is rotated as a result of coming into contact with an object surrounding the access port 22 or the workpiece accommodation section 23 instead of the guide member 5b or 5c. For example, if there is an edge surrounding the access port 22 or a wall surrounding the workpiece accommodation section 23, the edge or the wall may be used in place of the guide member 5b or 5c.

As an alternative to the above embodiment in which each gripping part is a gripper 11 that grips a workpiece W by using a plurality of fingers, the gripping part may grip the workpiece W by using another technique. For example, the gripping part may be of a suction type that suctions the workpiece W by using vacuum pressure or magnetic force.

As an alternative to the above embodiment in which the workpiece W is retrieved from and inserted into the workpiece accommodation section 23 in the vertical direction and the attachment surface 2b at the distal end of the robot arm 2a is translationally moved in the vertical direction, the retrieving-inserting direction may be another direction. For example, the workpiece W may be retrieved from and inserted into the workpiece accommodation section in the horizontal direction. In this case, the workpiece W is retrieved from and inserted into the workpiece accommodation section in accordance with horizontal translational movement of the attachment surface 2b.

The invention claimed is:

1. A hand device that is attached to a robot arm and that grips a workpiece extending helically around a helical axis, the hand device comprising:
   a base attached to the robot arm; and
   a gripping part that is supported by the base in a rotatable manner around a predetermined rotation axis and that grips the workpiece,
   wherein the gripping part grips the workpiece on the predetermined rotation axis such that the helical axis extends along the predetermined rotation axis, and rotates in a helical direction of the workpiece in accordance with an external force acting on the workpiece in a tangential direction around the predetermined rotation axis,
   wherein the hand device further comprises:
   a movable member that is disposed at an outer side of the gripping part in a radial direction orthogonal to the predetermined rotation axis;
   a driver that moves the movable member relative to the gripping part in a predetermined movement direction orthogonal to the predetermined rotation axis; and
   a pair of stoppers and a brake unit that are provided at the movable member and that are disposed at positions facing each other in the predetermined movement direction with the gripping part interposed therebetween,
   wherein an outer surface of the gripping part is provided with a pair of protrusions protruding away from each other from the outer surface in a tangential direction of a circle extending around the predetermined rotation axis,
   wherein the driver moves the movable member to switch among a return-to-origin state, a free rotational state, and a rotation-licked state,
   wherein the return-to-origin state is a state where the pair of stoppers simultaneously come into contact with the pair of protrusions to return a rotational position of the gripping part around the predetermined rotation axis to a predetermined origin position,
   wherein the free rotational state is a state where the pair of stoppers respectively abut on the pair of protrusions in a circumferential direction to restrict the rotation of the gripping part within a predetermined angular rangem and
   wherein the rotation-locked state is a state where the brake unit is pressed against the outer surface of the gripping part to lock the rotation of the gripping part.

2. The hand device according to claim 1, further comprising a rotation restricting mechanism that restricts a rotation of the gripping part relative to the base within a predetermined angular range.

3. The hand device according to claim 1, further comprising a rotation locking mechanism that locks a rotation of the gripping part disposed at any rotational position around the predetermined rotation axis.

4. The hand device according to claim 1, further comprising a return-to-origin mechanism that returns a rotational position of the gripping part around the predetermined rotation axis to a predetermined origin position.

5. A workpiece handling system comprising:

a hand device that is attached to a first robot arm and that grips a workpiece extending helically around a helical axis; and a guide device that is disposed in a vicinity of an access port of a workpiece accommodation section and that guides the workpiece to be retrieved from and inserted into the workpiece accommodation section, wherein the hand device comprises:

a first base attached to the first robot arm; and a gripping part that is supported by the base in a rotatable manner around a predetermined rotation axis and that grips the workpiece, wherein the gripping part grips the workpiece on the predetermined rotation axis such that the helical axis extends along the predetermined rotation axis, and rotates in a helical direction of the workpiece in accordance with an external force acting on the workpiece in a tangential direction around the predetermined rotation axis, wherein the hand device further comprises:

a movable member that is disposed at an outer side of the gripping part in a radial direction orthogonal to the predetermined rotation axis;

a driver that moves the movable member relative to the gripping part in predetermined movement direction orthogonal to the predetermined rotation axis; and a pair of stoppers and a brake unit that are provided at the movable member and that are disposed at positions facing each other in the predetermined movement direction with the gripping part interposed therebetween, wherein an outer surface of the gripping part is provided with a pair of protrusions protruding aways from each other from the outer surface in a tangential direction of a circle extending around the predetermined rotation axis, wherein the driver moves the movable member to switch among a return-to-origin state, a free rotational state, and a rotation-locked state, wherein the return-to-origin state is a state where the pair of stoppers simultaneously come into contact with the pair of protrusions to return a rotational position of the gripping part around the predetermined rotation axis to a predetermined origin position, wherein the free rotational state is a state where the pair of stoppers respectively abut on the pair of protrusions in a circumferential direction to restrict the rotation of the gripping part within a predetermined angular range, wherein the rotation-locked state is a state where the brake unit is pressed against the outer surface of the gripping part to lock the rotation of the gripping part, and wherein the guide device comprises:

a second base attached to second a robot arm; and a pair of guide members that are supported by the second base and that are disposed at opposite sides of the access port.

6. The workpiece handling system according to claim 5, further comprising:

a processor configured to control operation of the first robot arm, wherein, when the workpiece gripped by the gripping part is to be retrieved from and inserted into the workpiece accommodation section, the processor is configured to cause a distal end of the first robot arm to translationally move in a retrieving-inserting direction of the workpiece.

7. The workpiece handling system according to claim 6, further comprising:

a vision sensor for detecting the access port of the workpiece accommodation section and the workpiece contained in the workpiece accommodation section, wherein the processor is configured to control the first robot arm based on the access port and a position of the workpiece detected by using the vision sensor.

* * * * *